United States Patent
Peng et al.

(10) Patent No.: US 11,196,580 B2
(45) Date of Patent: Dec. 7, 2021

(54) METHOD AND DEVICE FOR BEARING MULTICAST VIRTUAL PRIVATE NETWORK

(71) Applicant: ZTE CORPORATION, Guangdong (CN)

(72) Inventors: Shaofu Peng, Guangdong (CN); Feicai Jin, Guangdong (CN); Benchong Xu, Guangdong (CN); Ning Cai, Guangdong (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 0 days.

(21) Appl. No.: 16/956,639

(22) PCT Filed: Nov. 30, 2018

(86) PCT No.: PCT/CN2018/118564
§ 371 (c)(1),
(2) Date: Jun. 22, 2020

(87) PCT Pub. No.: WO2019/128621
PCT Pub. Date: Jul. 4, 2019

(65) Prior Publication Data
US 2020/0412562 A1     Dec. 31, 2020

(30) Foreign Application Priority Data
Dec. 29, 2017 (CN) .......... 201711481039.X

(51) Int. Cl.
*H04L 12/18* (2006.01)
*H04L 12/46* (2006.01)
(Continued)

(52) U.S. Cl.
CPC ........ *H04L 12/1836* (2013.01); *H04L 12/185* (2013.01); *H04L 12/4604* (2013.01);
(Continued)

(58) Field of Classification Search
CPC .............. H04L 12/1836; H04L 12/185; H04L 12/4604; H04L 12/4675; H04L 45/04; H04L 45/16
See application file for complete search history.

(56) References Cited

U.S. PATENT DOCUMENTS 9,438,432 B2      9/2016  Shepherd et al.
10,069,639 B2 *   9/2018  Bragg ..................... H04L 45/12
(Continued)

FOREIGN PATENT DOCUMENTS

CN     102137000 A     7/2011
CN     102916888 A     2/2013
(Continued)

OTHER PUBLICATIONS

WIPO, International Search Report dated Jan. 28, 2019.
China Patent Office, First Office Action dated Dec. 16, 2020 regarding Chinese application No. 201711481039.X.

*Primary Examiner* — Todd L Barker
(74) *Attorney, Agent, or Firm* — Li & Cai Intellectual Property (USA) Office

(57) ABSTRACT

Provided in embodiments of the present disclosure are a method and a device for bearing a multicast virtual private network. The method includes: assigning, by a BFIR accessing a VRF, a global VPN identifier to a multicast VRF, and carrying the global VPN identifier to notify a route to a BFER accessing the multicast VRF; after receiving a packet of the multicast VRF, encapsulating, by the BFIR, the packet with a BIER header and forwarding the packet, the forwarded packet carrying the global VPN identifier.

17 Claims, 3 Drawing Sheets

(51) Int. Cl.
H04L 12/715 (2013.01)
H04L 12/761 (2013.01)
(52) U.S. Cl.
CPC .......... *H04L 12/4675* (2013.01); *H04L 45/04* (2013.01); *H04L 45/16* (2013.01)

(56) References Cited

U.S. PATENT DOCUMENTS

| | | | |
|---|---|---|---|
| 2004/0093492 A1* | 5/2004 | Daude | H04L 63/0272 713/156 |
| 2007/0058638 A1* | 3/2007 | Guichard | H04L 45/50 370/395.31 |
| 2014/0160925 A1* | 6/2014 | Xu | H04L 45/00 370/235 |
| 2015/0078378 A1* | 3/2015 | Wijnands | H04L 45/74 370/390 |
| 2016/0277291 A1 | 9/2016 | Lakshmikanthan et al. | |
| 2016/0277463 A1 | 9/2016 | Nagarajan et al. | |
| 2016/0359745 A1* | 12/2016 | Hao | H04L 12/4641 |
| 2018/0102919 A1* | 4/2018 | Hao | H04L 45/64 |
| 2020/0245206 A1* | 7/2020 | Allan | H04L 45/04 |

FOREIGN PATENT DOCUMENTS

| | | |
|---|---|---|
| CN | 104702480 A | 6/2015 |
| CN | 105991302 A | 10/2016 |
| CN | 106656524 A | 5/2017 |

* cited by examiner

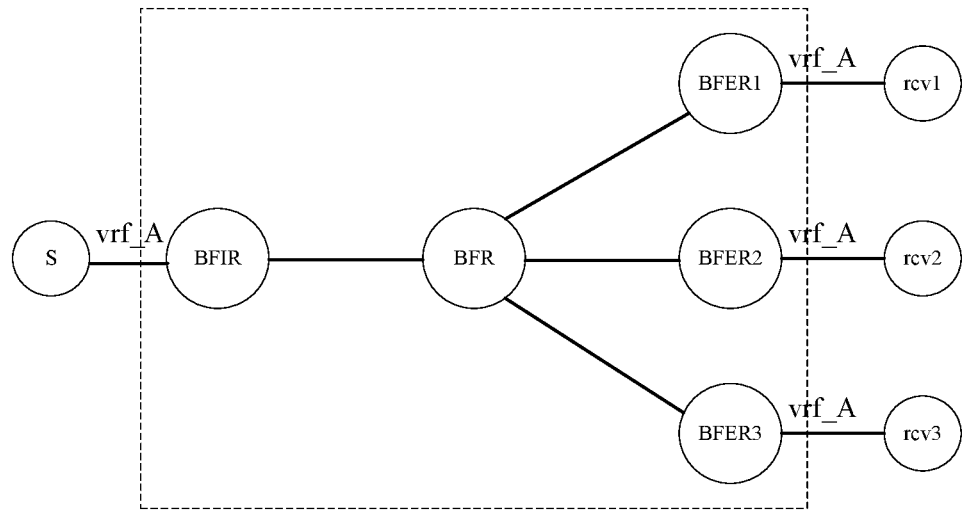
Fig. 1
110, a BFIR accessing the multicast VRF assigns a global VPN identifier for the multicast VRF, and carries the global VPN identifier to notify a BFER accessing the multicast VRF
120, after receiving a packet of the multicast VRF, the BFIR encapsulates the packet with a BIER head and forwards the packet, where the forwarded packet carries the global VPN identifier
Fig. 2
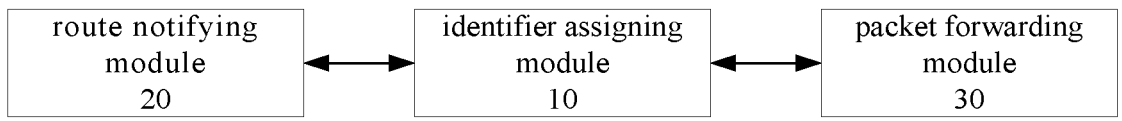
Fig. 3

METHOD AND DEVICE FOR BEARING MULTICAST VIRTUAL PRIVATE NETWORK

TECHNICAL FIELD

The present disclosure relates to the field of data communication, and in particular, to a method and a device for bearing a multicast virtual private network.

BACKGROUND

Bit indexed explicit replication (BIER) describes a new architecture for multicast packet forwarding, and provides an optimal path forwarding for multicast data packets in a multicast domain, which does not need to use a protocol to establish a multicast distribution tree, and there is not any flow state to be maintained with an intermediate node. When a multicast packet reaches a bit-forwarding ingress router (BFIR) from outside the domain, the BFIR first determines in which BIER sub-domain (SD) the packet is to be sent and to which bit-forwarding egress router (BFER) the packet is to be sent, and then a "BIER header" is inserted into a header of the packet, where the BIER header includes a BitString and each bit of the BitString represents a bit-forwarding egress router identifier (BFR-id) of a corresponding BFER.

A draft standard draft-ietf-bier-mvpn-06 describes a public network bearing method in which a BIER type of operator tunnel (P-tunnel) is used as a multicast Virtual Private Network (VPN), which employs an upstream-assigned multi-protocol label switching (MPLS) label, because the BIER belongs to a P node replication technology, i.e. a BIER-encapsulated multicast virtual routing forwarding (VPN routing forwarding, VRF) label must be the same for all egress provider edges (PEs).

However, in an actual network deployment, the upstream-assigned MPLS label is not widely used, mainly because forwarding chips of many devices do not support maintaining a variety of specific context label spaces, and an identifier of each specific context label space may be any information such as a tunnel identifier (tunnel id), an IP address, an MPLS label, a virtual local area network (VLAN) identifier, or a BFIR identifier defined by draft-ietf-bier-mvpn-06, which depends on different application scenarios, such various identifier information seems flexible, but in fact, it doesn't work for the forwarding chip with limited table space resources. Moreover, related technologies lack a constraint and a uniform specification for the identifier of context label space, and under this premise, many devices select not to support the upstream-assigned MPLS label, and a multicast VPN method based on BIER cannot be implemented.

SUMMARY

An embodiment of the present disclosure provides a method for bearing a multicast virtual private network (VPN), including: assigning, by a bit-forwarding ingress router (BFIR) accessing a multicast virtual private network routing forwarding (VRF), a global VPN identifier for the multicast VRF, and carrying the global VPN identifier to notify a route to a bit-forwarding egress router (BFER) accessing the multicast VRF; and after receiving a packet of the multicast VRF, encapsulating, by the BFIR, the packet with a bit indexed explicit replication (BIER) header and forwarding the packet, where the forwarded packet carries the global VPN identifier.

An embodiment of the present disclosure further provides a bit-forwarding ingress router (BFIR), including: an identifier assigning module configured to assign a global VPN identifier for a multicast virtual private network routing forwarding (VRF) accessed by the BFIR; a route notifying module configured to notify a route to a bit-forwarding egress router (BFER) accessing the multicast VRF, where the route carries the global VPN identifier; and a packet forwarding module configured to encapsulate a bit indexed explicit replication (BIER) header for a packet of the multicast VRF after receiving the packet, and forward the packet, where the forwarded packet carries the global VPN identifier.

An embodiment of the present disclosure further provides a method for bearing a multicast virtual private network (VPN), including: assigning, by a bit-forwarding egress router (BFER) accessing a multicast virtual private network routing forwarding (VRF), a global VPN identifier for the multicast VRF, and recording forwarding information of a packet with the global VPN identifier; and after receiving the packet with the global VPN identifier, removing, by the BFER, a BIER header of the packet, searching for the forwarding information and forwarding the packet.

An embodiment of the present disclosure further provides a bit-forwarding egress router (BFER), including: an identifier assigning module configured to assign a global VPN identifier for a multicast virtual private network routing forwarding (VRF) accessed by the BFER; an information recording module configured to record forwarding information of a packet with the global VPN identifier; and a packet forwarding module configured to remove a BIER header of the packet with the global VPN identifier after receiving the packet, search for the forwarding information and forward the packet.

An embodiment of the present disclosure further provides a bit-forwarding ingress router, including a memory, a processor, and a computer program that is stored in the memory and capable of running on the processor, and when the processor executes the computer program, the method provided by the present disclosure is implemented.

An embodiment of the present disclosure further provides a computer-readable storage medium, on which a computer program is stored, where the computer program, when executed by a processor, cause the processor to implement the method provided by the present disclosure.

Technical solutions of the above embodiments realize a packet forwarding through the global VPN identifier. Such forwarding mechanism is simpler and easier to be implemented and deployed.

DESCRIPTION OF DRAWINGS

FIG. 1 is a network topology diagram of a basic multicast VPN scenario according to an embodiment of the present disclosure;

FIG. 2 is a flowchart of a method for bearing a multicast VPN at a BFIR side according to an embodiment of the present disclosure;

FIG. 3 is a block diagram of a bit-forwarding ingress router according to an embodiment of the present disclosure;

DESCRIPTION OF EMBODIMENTS

Figure 4:
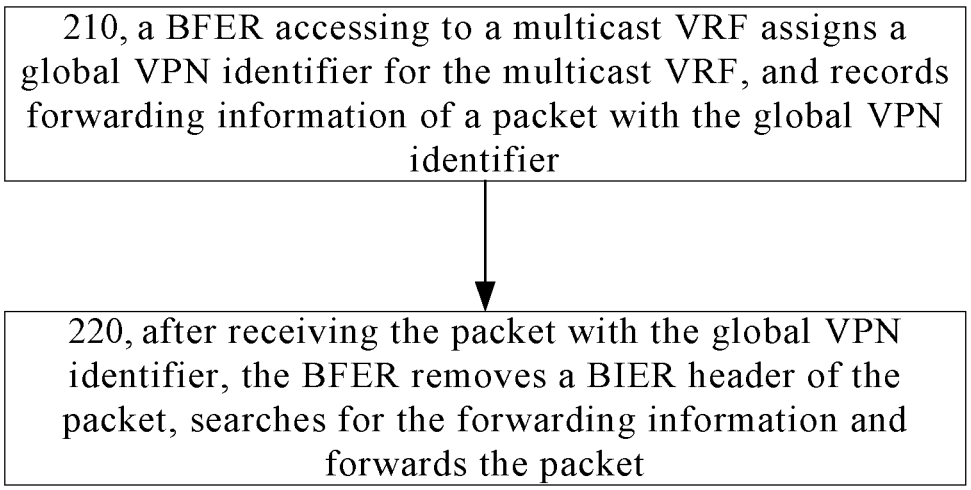
FIG. 4 is a flowchart of a method for bearing a multicast VPN at a BFER side according to an embodiment of the present disclosure.

In order to make objects, technical solutions and advantages of the present disclosure more apparent, embodiments of the present disclosure will be described in detail below with reference to the accompanying drawings. It should be noted that the embodiments and features of the embodiments in the present disclosure may be arbitrarily combined with each other without conflict.

An embodiment of the present disclosure provides a method for bearing a multicast VPN, which relates to forwarding of multicast VPN packets and related processes for implementing packet forwarding, such as identifier assigning and route notifying.

FIG. 1 is a network topology diagram of a basic multicast VPN scenario, where a BFIR accesses to a VRF_A multicast source S, and BFER1 to BFER3 access to multicast receivers rcv1 to rcv3 of the VRF_A, respectively, and the diagram further shows a bit-forwarding router (BFR) located between the BFIR and the BFERs, where VRF_A represents an instance, named A, of multicast VRF. The diagram is only an example, and in other examples, the BFIR and the S may not be necessarily directly coupled, and the BFIR only needs to know that its left incoming interface is coupled to the multicast source. A BFER and a multicast receiver are also not necessarily directly coupled, and the BFER only needs to know that its right output interface is coupled to the multicast receiver. Both the BFIR and the BFERs belong to PE nodes accessing the multicast VRF.

FIG. 2 is a flowchart of a method for bearing a multicast VPN at a BFIR side in the embodiment, including following steps 110 and 120.

At step 110, the BFIR accessing the multicast VRF assigns a global VPN identifier for the multicast VRF, and carries the global VPN identifier to notify a route to a BFER accessing the multicast VRF.

In a software defined network (SDN), for a multicast VPN service, a single global VPN identifier (global VPN id) is allocated to a single multicast VRF at each boundary PE. That is, at the PE accessing a certain multicast VRF, the multicast VRF is uniquely identified by the global VPN identifier. The global VPN identifier of the multicast VPN may be uniformly assigned and issued to each boundary PE by a controller, or statically configured by an administrator on each boundary PE, or assigned in another manner.

In the embodiment, a BGP (border gateway protocol) I-PMSI (inclusive P-multicast service interface) A-D (auto-discovery) or a S-PMSI (selective P-multicast service interface) A-D notification that uses the BIER as a P-tunnel is extended, where the notification (or notification message) carries the global VPN identifier (global VPN id) of the multicast VRF. In an example, when the BFIR notifies the route to the BFER accessing the multicast VRF, the global VPN identifier of the multicast VRF may be carried in a MPLS label field of the notified route.

PMSI (P-multicast service interface) tunnel attributes of the notified BGP I-PMSI A-D or S-PMSI A-D route in the embodiment includes following fields:

Tunnel Type: an extended value indicating a type of "BIER with global VPN";

Tunnel Identifier: including information of BIER sub-domain id and BFIR-Prefix;

MPLS Label: this field is generally set to a certain label value in RFC6514, and is set to "global VPN id" in this embodiment;

Flags: including two flag bits: 1) a flag bit of "Leaf Info Required", which is defined as that in RFC6514; 2) a flag bit of "Leaf Info Required per Flow (LIR-pF)", which is defined as that in draft-ietf-bess-mvpn-expl-track.

It can be seen that, in this embodiment, based on the PMSI Tunnel Attribute defined by rfc6514, the tunnel type is extended by adding a new tunnel type, which is referred to as an "extended protocol type" in the present disclosure. The extended tunnel type is used for indicating that a tunnel is based on the BIER with the global VPN identifier, i.e., the BIER improved by the present disclosure. The extended tunnel type is referred to as a type of "BIER with global VPN" in this embodiment, but the present disclosure is not limited thereto, and any other name may be used for the extended tunnel type. The type of "BIER with global VPN" can be represented by using an extended value of the Tunnel Type field.

At step 120, after receiving a packet of the multicast VRF, the BFIR encapsulates the packet with a BIER header and forwards the packet, where the forwarded packet carries the global VPN identifier.

In the embodiment, the BFIR creates an instance of the multicast VRF, and in a route of a multicast VRF routing table corresponding to the instance, it is indicated, by using the extended tunnel type, that the tunnel is based on the BIER with the global VPN identifier; after receiving a packet of the multicast VRF, the BFIR searches for a route matched with the packet from the multicast VRF routing table, and presses the global VPN identifier into the packet when it is determined that the tunnel type of the route is the extended tunnel type; and then, the packet is encapsulated with the BIER header and forwarded.

In the embodiment, when the BFIR notifies the route to a BFER accessing the multicast VRF, the BFIR further sets the Tunnel Type in the route as the extended tunnel type, where the extended tunnel type is used for indicating that the tunnel is based on the BIER with the global VPN identifier.

In another embodiment, the BFIR does not create an instance of the multicast VRF, and in order to implement forwarding, after the BFIR assigns the global VPN identifier to the multicast VRF, a table entry with the global VPN identifier as a key value is established in a forwarding table, and forwarding information of the packet carrying the global VPN identifier is recorded in the table entry; after receiving a packet of the multicast VRF, the BFIR removes a layer 2 header of the packet, and when it is determined, according to a protocol type extended in the layer 2 header, that the global VPN identifier is included after the layer 2 header, the BFIR searches for the forwarding information from the forwarding table; and then, the packet is encapsulated with the BIER header and forwarded. In this embodiment, when the BFIR notifies a route to a BFER accessing the multicast VRF, the global VPN identifier may be carried, and the Tunnel Type in the route is set as the extended tunnel type.

In the embodiment, the layer-2-encapsulated protocol type is extended, and when an upstream node (for example, a BFER in another domain) forwards a packet of the multicast VRF to the BFIR, the extended protocol type is used in the layer 2 header to indicate that the global VPN identifier is included after the layer 2 header, where the extended protocol type may be represented by a value extended in a Protocol Type field, and the extended protocol type may be referred to as "Multicast global VPN", but the present disclosure does not limit the name of the extended protocol type. After the packet is encapsulated as above, the BFIR may determine, according to the protocol type extended in the layer 2 header of the packet, that the global VPN identifier is included after the layer 2 header, and the global VPN identifier does not need to be pressed in at this moment. A layer 2 encapsulation is an encapsulation of a data link layer of the packet from which the BIER header is removed, by extending the protocol type in the layer 2 header, an encapsulation and an analysis of the global VPN identifier in the packet of the multicast VRF can be supported, and when the next node analyzes the layer 2 header of the packet, the next node can know, according to the protocol type "Multicast global VPN" in the layer 2 header, that the global VPN id is after the layer 2 header.

In above embodiments, the packet type in the BIER header is extended, and when the BFIR encapsulates a packet with the BIER header, the packet type in the BIER header is set as the extended packet type, where the extended packet type is used for indicating that the packet carries the global VPN identifier of the multicast VRF. By extending the packet type in the BIER header, the encapsulation and the analysis of the global VPN identifier in the packet of the multicast VRF can be supported. In the embodiment, on a basis of the BIER header defined in draft-ietf-bier-mpls-encapsulation-07, a value is added to the Proto field to indicate the extended packet type, where the extended packet type may be referred to as "Multicast global VPN", but the present disclosure is not limited thereto.

An embodiment of the present disclosure further provides a bit-forwarding ingress router, as shown in FIG. 3, including an identifier assigning module 10, a route notifying module 20 and a packet forwarding module 30.

The identifier assigning module 10 is configured to assign a global VPN identifier for a multicast VRF accessed by the bit-forwarding ingress router (BFIR).

The route notifying module 20 is configured to notify a route to a bit-forwarding egress router (BFER) accessing the multicast VRF, where the route carries the global VPN identifier.

The packet forwarding module 30 is configured to, after receiving a packet of the multicast VRF, encapsulate the packet with a bit indexed explicit replication (BIER) header and forward the packet, where the forwarded packet carries the global VPN identifier.

In the embodiment, the BFIR further includes: an instance creating module configured to create an instance of the multicast VRF, where in a route of a multicast VRF routing table corresponding to the instance, it is indicated, by using an extended tunnel type, that a tunnel is based on the BIER with the global VPN identifier.

After receiving a packet of the multicast VRF, the packet forwarding module 30 is also configured to search for a route matched with the packet from the multicast VRF routing table, and when the Tunnel Type of the route is determined to be the extended tunnel type, press the global VPN identifier into the packet; and then, encapsulate the packet with the BIER header and forward the packet.

In the embodiment, when the route notifying module 20 notifies the route to the BFER accessing the multicast VRF, the route notifying module 20 further sets the Tunnel Type in the route as the extended tunnel type.

In the embodiment, when the BFIR notifies the route to the BFER accessing the multicast VRF, the global VPN identifier is carried in the multi-protocol label switching (MPLS) label field of the notified route.

In another embodiment, the BFIR includes an identifier assigning module 10, a route notifying module 20 and a packet forwarding module 30, where functions of the identifier assigning module 10 and the route notifying module 20 may be the same as those described above. The BFIR further includes: a forwarding table maintenance module configured to establish a table entry with the global VPN identifier as a key value in a forwarding table, and record forwarding information of a packet carrying the global VPN identifier in the table entry; after receiving a packet of the multicast VRF, the packet forwarding module 30 removes a layer 2 header of the packet, and when it is determined, according to a protocol type extended in the layer 2 header, that the global VPN identifier is included after the layer 2 header, the packet forwarding module 30 searches for the forwarding information from the forwarding table; and then, encapsulates the packet with a BIER header and forwards the packet.

In above embodiments, when the packet forwarding module 30 encapsulates the packet with the BIER header, the packet type in the BIER header is set as the extended packet type, and the extended packet type is used for indicating that the packet carries the global VPN identifier of the multicast VRF.

A network topology according to the embodiment can be seen in FIG. 1. In above embodiments, the method for bearing the multicast VPN is described from the BFIR side, and in this embodiment, the method for bearing the multicast VPN is described from the BFER side. For understanding the method of this embodiment, reference may be made to those described above from the BFIR side.

The flow of the method for bearing the multicast VPN at the BFER side in this embodiment is shown in FIG. 4, and the method includes steps 210 to 220. At step 210, assigning, by a BFER accessing to a multicast VRF, a global VPN identifier for the multicast VRF, and recording forwarding information of a packet with the global VPN identifier. At step 220, after receiving the packet with the global VPN identifier, removing, by the BFER, a BIER header of the packet, searching for the forwarding information and forwarding the packet. Since the global VPN identifier is a unique identifier of the multicast VPN, the packet with the global VPN identifier is the packet of the multicast VRF.

In the embodiment, the BFER creates an instance of the multicast VRF, and the global VPN id is used in the node to distinguish multicast VRF routing tables corresponding to different instances of multicast VRF. The forwarding information of the packet with the global VPN identifier is recorded in the route of the multicast VRF routing table corresponding to the instance; the BFER searching for the forwarding information and forwarding the packet includes: when the BFER determines that the packet type in the BIER header is an extended packet type, removing the global VPN identifier after the BIER header, and forwarding the remaining load by searching the multicast VRF routing table, where the extended packet type is used for indicating that the packet carries the global VPN identifier of the multicast VRF.

In another embodiment, the BFER does not create an instance of the multicast VRF, and after the BFER assigns the global VPN identifier to the multicast VRF, the BFER establishes a table entry with the global VPN identity as a key value in a forwarding table, and records forwarding information of a packet with the global VPN identifier in the table entry. After receiving a packet with the global VPN identifier, the BFER removes a BIER header of the packet. When a packet type in the BIER header is determined to be the extended packet type, the BFER searches for, according to the global VPN identifier after the BIER header, the forwarding information in the forwarding table and forwards the packet, where the extended packet type is used for indicating that the global VPN identifier of the multicast VRF is carried in the packet. In this embodiment, the BFER forwarding the packet includes: when the BFER encapsulates the packet in layer 2, setting the protocol type in the layer 2 header as an extended protocol type, where the extended protocol type is used for indicating that there is the global VPN identifier after the layer 2 header.

Figure 5:
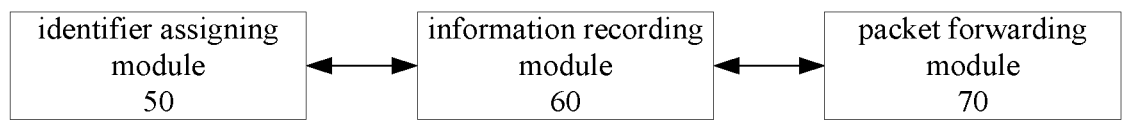
FIG. 5 is a block diagram of a bit-forwarding egress router according to an embodiment of the present disclosure.

An embodiment of the present disclosure further provides a bit-forwarding egress router, as shown in FIG. 5, including an identifier assigning module 50, an information recording module 60 and a packet forwarding module 70.

The identifier assigning module 50 is configured to assign a global VPN identifier for a multicast virtual private network routing forwarding (VRF) accessed by the bit-forwarding egress router (BFER).

The information recording module 60 is configured to record forwarding information of a packet with the global VPN identifier.

The packet forwarding module 70 is configured to remove a BIER header of the packet with the global VPN identifier after receiving the packet, search for the forwarding information and forward the packet.

In the embodiment, the information recording module 60 recording the forwarding information of the packet with the global VPN identifier includes: creating an instance of the multicast VRF, and recording the forwarding information of the packet with the global VPN identifier in a route of a multicast VRF routing table corresponding to the instance.

The packet forwarding module 70 searching for the forwarding information and forwarding the packet includes: when the packet type in the BIER header is determined to be an extended packet type, removing the global VPN identifier after the BIER header, and forwarding the remaining load by searching the multicast VRF routing table, where the extended packet type is used for indicating that the packet carries the global VPN identifier of the multicast VRF.

In another embodiment, the information recording module 60 recording the forwarding information of the packet with the global VPN identifier includes: establishing a table entry with the global VPN identifier as a key value in a forwarding table, and recording the forwarding information of the packet with the global VPN identifier in the table entry.

The packet forwarding module 70 searching for the forwarding information and forwarding the packet includes: when the packet type in the BIER header is determined to be an extended packet type, searching for the forwarding information in the forwarding table according to the global VPN identifier after the BIER header and forwarding the packet, where the extended packet type is used for indicating that the packet carries the global VPN identifier of the multicast VRF.

In the embodiment, the packet forwarding module 70 forwarding the packet includes: when the packet is packaged in layer 2, setting the protocol type in the layer 2 header as an extended protocol type, where the extended protocol type is used for indicating that there is the global VPN identifier after the layer 2 header.

In the embodiments described above, forwarding chip is not required to establish a wide variety of context table spaces, and by using a global VPN identifier, packet forwarding can be implement by a basic function of a VRF (for example, an instance of VRF routing table or a forwarding table) supported by a router. The forwarding mechanism is simpler and easier to be implemented and deployed. The mode of using the upstream-assigned MPLS label may be replaced.

An overall flow of the method for bearing the multicast VPN is described based on a network topology diagram of a basic multicast VPN scenario.

At Step One, at a PE node (including BFIR and BFER) accessing a multicast VRF, a global VPN id is assigned to the multicast VRF through a controller or a static configuration.

The global VPN id is generally used in a node to distinguish, by default, multicast VRF routing tables corresponding to different instances of multicast VRF, and is applicable to nodes capable of locally creating instances of multicast VRF (for example, ingress PE and egress PE nodes in a basic multicast VPN scenario). In general, each multiple VRF only needs to be assigned with a unique global VPN id. However, in order to support more application scenarios, multiple unique global VPN ids may be assigned to each multicast VRF, for example, in an example, according to policies, different global VPN ids may be used by different I-PMSI (P-Multicast Service Interface) or S-PMSI A-D routes of the multicast VRF.

In another embodiment, a new function may be introduced into the global VPN id, which is suitable for nodes that do not create instance of the multicast VRF (for example, ASBR nodes in a cross-domain scenario of option B of the multicast VPN), and a table entry is directly created in a forwarding table by using the global VPN id as a key value, and corresponding forwarding information is given in the table entry to guide a packet carrying the global VPN id to be forwarded to a corresponding next hop, where the forwarding table may also be referred to as a "global VPN id forwarding table". The two functions of the global VPN id are generally mutually exclusive.

In an example, it is default that an entire multicast VPN routing table is differentiated by the global VPN id, and an explicit configuration is not necessary, but in order to establish an entry with the global VPN id as a key value, a capability of establishing the entry with the global VPN id as the key value, also referred to as "global VPN id forwarding capability", needs to be explicitly configured at the node (i.e., the capability is enabled).

At Step Two, the BFIR node accessing a VRF multicast source notifies a BGP I-PMSI A-D or S-PMSI A-D route to other BFER nodes accessing VRF multicast receivers, where the PTA (PMSI Tunnel Attribute) contains information of the global VPN id of the multicast VRF, and the tunnel type in the PTA is set as "BIER with global VPN", i.e., "BIER using global VPN", which is different from the type "BIER" defined in draft-ietf-bier-mvpn-06.

Other processes of the BFIR nodes notifying the S-PMSI A-D or I-PMSI A-D route may be performed in accordance with procedures defined in RFC6513, so that a corresponding set of BFER nodes may be determined at the BFIR node for a particular VRF multicast flow.

At Step Three, when the packet is forwarded, the BFIR node searches for the S-PMSI A-D or I-PMSI A-D route to match the packet to be transmitted, if the PTA of the matched route indicates that the tunnel type is "BIER with global VPN", the global VPN id of the route is firstly pressed (pushed or inserted) into the packet, for example, the global VPN id is added in front of the original packet, then the packet is encapsulated with the BIER header and forwarded. The packet type encapsulated in the BIER header is set as an extended packet type, i.e., "Multicast global VPN".

At Step Four, when a BFER node receives the BIER-encapsulated packet, if it is found that the packet needs to be uploaded to the multicast service layer after the BIER header is locally removed, according to the fact that the packet type encapsulated in the BIER header is "Multicast global VPN", the BFER node knows that the global VPN id is just after the BIER header. After removing the BIER header and the global VPN id from the packet, the BFER node continues to forward the remaining load by searching the multicast VRF routing table corresponding to the global VPN id.

In another embodiment, if the BFER node is explicitly configured with the "global VPN id forwarding capability", after receiving the BIER-encapsulated packet, the BFER node removes the BIER header from the packet, searches the "global VPN id forwarding table" according to the global VPN id after the BIER header to acquire corresponding forwarding information, and forwards the packet to a corresponding next hop.

In this embodiment, forwarding chip is not required to establish a wide variety of context table spaces, and only need to establish an instance of VRF routing table, and establishing the instance of the VRF routing table is a basic function of a VRF supported by a router. The forwarding mechanism is simpler and easier to be implemented and deployed. The mode of using the upstream-assigned MPLS label may be replaced to improve the existing standard.

FIG. 1 is a network topology diagram of a basic multicast VPN scenario in the embodiment, where the BFIR accesses to a VRF_A multicast source S, and BFER1 to BFER3 access to multicast receivers rcv1 to rcv3 of VRF_A, respectively, where VRF_A represents an instance of VRF named A.

The method according to the embodiment mainly includes following steps 301 to 304.

At step 301, the BFIR and the BFER1 to BFER3 assign a unique global VPN identifier (marked as global VPN id 100) for the VRF_A, and create an instance of the VRF_A, including establishing a multicast VRF routing table of the VRF_A.

At step 302, the BFIR node notifies a BGP I-PMSI A-D or S-PMSI A-D route to each BFER node, a tunnel type in the PTA is set as "BIER with global VPN" and the global VPN id 100 is contained. The other processes of notifying the route may be performed according to the procedures defined in RFC6513, so that the set of corresponding multicast receivers may be determined as {BFER1, BFER2, BFER3} for a particular multicast stream of VRF_A on the BFIR node, and the S node determines that the BFIR is one of the receivers of the corresponding multicast stream.

At step 303, the BFIR receives the particular multicast stream of S, and searches for the S-PMSI A-D or I-PMSI A-D route in the multicast VRF routing table corresponding to the locally maintained instance of VRF_A to match the packet to be transmitted. In this embodiment, the PTA of the matched route indicates that the tunnel type is "BIER with global VPN", the global VPN id of the route is firstly pressed into the packet, and then the packet is encapsulated with a BIER header and forwarded. The field of the packet type encapsulated in the BIER header is set to be "Multicast global VPN", and the BitString in the BIER header includes BFER1 to BFER 3.

At step 304, according to the BIER forwarding flow, packets are uploaded to a multicast service layer after BIER headers are locally removed at BFER1 to BFER 3, respectively. Taking BFER1 as an example, the BFER1 knows that the global VPN id is just after the BIER header in the packet, according to the value "Multicast global VPN" of the packet type field encapsulated by the BIER header, and thus after removing the BIER header and the global VPN id 100 from the packet, the remaining load is continuously forwarded by searching a multicast VRF routing table corresponding to the global VPN id 100, and the packet is sent to an rcv1 node. Processes of the BFER2 node and the BFER3 node are similar to above.

Figure 6:
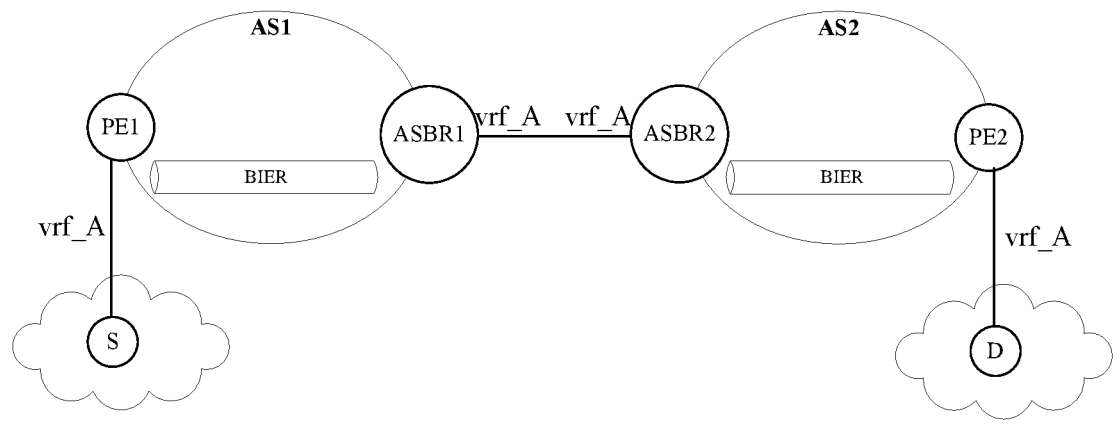
FIG. 6 is a network topology diagram of a multicast VPN cross-domain option A scenario according to an embodiment of the present disclosure.

FIG. 6 is a network topology diagram of a multicast VPN cross-domain option A scenario of the embodiment, where the scenario is actually formed by splicing two basic multicast VPN topologies, and the diagram shows a multicast source S, a multicast receiver D, two edge device nodes PE1 and PE2 of an Autonomous System (AS), and two ASBR (Autonomous System Boundary Router) nodes ASBR1 and ASBR2, where ASBR1 and ASBR2 are VRF_A clients for each other. In the diagram, PE1 in AS1 network corresponds to BFIR, ASBR1 corresponds to BFER; ASBR2 in AS2 network corresponds to BFIR, and PE2 corresponds to BFER.

The method for bearing the multicast VPN includes following steps 401 to 408.

At step 401, PE1, PE2, ASBR1, and ASBR2 assign a global VPN identifier (denoted as global VPN id 100) to VRF_A and create an instance of VRF_A, including creating a multicast VRF routing table of VRF_A.

At step 402, PE1 notifies BGP I-PMSI A-D or S-PMSI A-D route to ASBR1, a tunnel type in the PTA is set as "BIER with global VPN" and the global VPN id 100 is contained. The other processes may be performed according to the flow defined in RFC6513, so that a set of corresponding multicast receivers may be determined to be {ASBR1} for a particular multicast stream of VRF_A on PE1 node, and the S node determines that PE1 is one of the receivers of the corresponding multicast stream.

At step 403, ASBR1 node continues to notify BGP I-PMSI A-D or S-PMSI A-D route to ASBR2 node, and the tunnel type in the PTA is set as "No tunnel information present" (see RFC6514). Other processes may be performed in accordance with the procedures defined in RFC6513, so that a set of corresponding multicast receivers may be determined to be {ASBR2} for a particular multicast stream of VRF_A on ASBR1 node.

PIM protocol may also be enabled between ASBR1 and ASBR2, so that the set of corresponding multicast receivers may be determined to be {ASBR2} for the particular multicast stream of VRF_A on ASBR1 node by sending a corresponding PIM message, which is a content of existing standard and will not be described in detail.

At step 404, ASBR2 node continues to notify BGP I-PMSI A-D or S-PMSI A-D route to PE2 node, the tunnel type in the PTA is set as "BIER with global VPN" and the global VPN id 100 is contained. Other processes may be performed in accordance with the procedures defined in RFC6513, so that a set of corresponding multicast receivers may be determined to be {PE2} for a particular multicast stream of VRF_A on ASBR2 node.

It should be noted that ASBR2 may independently and autonomously select a tunnel type, which does not need to be the same as the tunnel type of any other domain. In the embodiment, ASBR2 has a BIER forwarding capability, and thus the BIER forwarding mechanism is selected.

At step 405, PE1 receives a particular multicast stream of S, searches for the S-PMSI A-D or I-PMSI A-D route in the multicast VRF routing table corresponding to the locally maintained instance of VRF_A, to match the packet to be transmitted, if the PTA of the matched route indicates that the tunnel type is "BIER with global VPN", the global VPN id of the route is firstly pressed into the packet, and then the packet is encapsulated with a BIER header and forwarded. The field of the packet type encapsulated in the BIER header will be set to "Multicast global VPN", and the BitString in the BIER header will contain a corresponding bit of ASBR1.

At step 406, after the BIER header is locally removed at ASBR1, the packet is sent to a multicast service layer according to a conventional BIER forwarding flow. ASBR1 knows that the global VPN id information is just after the BIER header in the packet according to the value of "Multicast global VPN" in the field of packet type encapsulated in the BIER header. After removing the BIER header and the global VPN id 100 from the packet, ASBR1 node continues to forward the remaining load by searching the multicast VRF routing table corresponding to the global VPN id 100, and the packet is sent to ASBR2 node.

When the packet is forwarded from ASBR1 to ASBR2, the forwarding is a traditional three-layer multicast IP forwarding, and BIER encapsulation is not needed.

At step 407, ASBR2 receives the particular multicast stream of ASBR1, searches for S-PMSI A-D or I-PMSI A-D route in the multicast VRF routing table corresponding to the locally maintained instance of VRF_A, to match the packet to be transmitted, if the PTA of the matched route indicates "BIER with global VPN", the global VPN id of the route is pressed into the packet, and the packed is encapsulated with a BIER header and forwarded. The field of the packet type encapsulated in the BIER header will be set to "Multicast global VPN", and the BitString in the BIER header will contain a corresponding bit of PE2.

At step 408, after the BIER header is locally removed at PE2, the packet is sent to the multicast service layer according to the BIER forwarding flow. PE2 knows that the global VPN id information is just after the BIER header in the packet according to the value "Multicast global VPN" of the field of packet type encapsulated in the BIER header. After removing the BIER header and the global VPN id 100 from the packet, PE2 node continues to forward the remaining load by searching the multicast VRF routing table corresponding to the global VPN id 100, and the packet is sent to D node.

Figure 7:
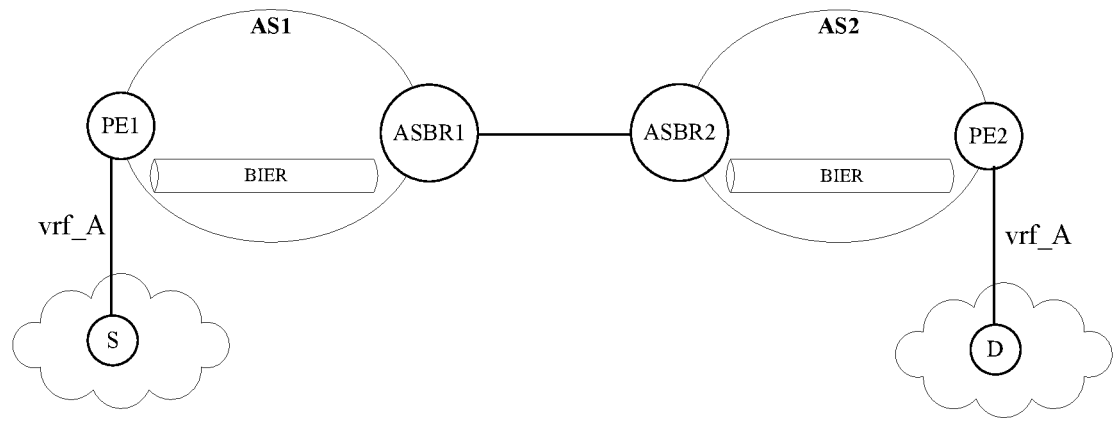
FIG. 7 is a network topology diagram of a multicast VPN cross-domain option B scenario according to an embodiment of the present disclosure.

FIG. 7 is a network topology diagram of a multicast VPN cross-domain option B scenario according to the embodiment, in which no instance of VRF is created on ASBR1 and ASBR2 nodes.

The method for bearing the multicast VPN includes following steps 501 to 509.

At step 501, both nodes PE1 and PE2 assign a global VPN identifier to VRF_A, which is marked as global VPN id 100, and a corresponding instance of multicast VRF is created.

At step 502, "global VPN id forwarding capability" is explicitly configured at ASBR1 and ASBR2 nodes, respectively.

In this step, the "global VPN id forwarding capability" can be explicitly configured at a device by turning on a switch for enabling the "global VPN id" forwarding capability through a command.

At step 503, PE1 node notifies BGP I-PMSI A-D or S-PMSI A-D route to ASBR1 node, the tunnel type in the PTA is set as "BIER with global VPN" and the global VPN id 100 is contained. The other processes may be performed according to the flow defined in RFC6513, so that a set of corresponding multicast receivers may be determined to be {ASBR1} for a particular multicast stream of VRF_A on PE1 node, and the S node determines that PE1 is one of the receivers of the corresponding multicast stream.

At step 504, ASBR1 node continues to notify BGP I-PMSI A-D or S-PMSI A-D route to ASBR2 node, and the tunnel type in the PTA is set as "No tunnel information present" (see RFC6514) and contains the global VPN id 100. Other processes may be performed in accordance with the flow defined in RFC6513.

In the embodiment, ASBR1 node establishes a table entry with the global VPN id 100 as a key value in a global VPN id forwarding table, where the table entry includes a set of corresponding multicast receiver {ASBR2}.

At step 505, ASBR2 node continues to notify BGP I-PMSI A-D or S-PMSI A-D route to PE2 node, the tunnel type in the PTA is set as "BIER with global VPN" and the global VPN id 100 is contained. Other processes may be performed in accordance with the flow defined in RFC 6513.

In the embodiment, ASBR2 node establishes a table entry with the global VPN id 100 as a key value in a global VPN id forwarding table, where the table entry includes a set of corresponding multicast receiver {PE2}.

At step 506, PE1 receives a particular multicast stream of S, searches for the S-PMSI A-D or I-PMSI A-D route in the multicast VRF routing table corresponding to the locally maintained instance of VRF_A, to match the packet to be transmitted, if the PTA of the matched route indicates that the tunnel type is "BIER with global VPN", the global VPN id of the route is firstly pressed into the packet, and the packet is encapsulated with a BIER header and forwarded. The field of the packet type encapsulated in the BIER header will be set to "Multicast global VPN", and the BitString in the BIER header will contain a corresponding bit of ASBR1.

At step 507, after the BIER header is locally removed at ASBR1, the packet is sent to a multicast service layer according to a BIER forwarding flow. ASBR1 knows that the global VPN id information is just after the BIER header in the packet according to the value of "Multicast global VPN" in the field of packet type encapsulated in the BIER header. After removing the BIER header from the packet, ASBR1 node searches for the entry using the global VPN id 100 as the key value in the global VPN id forwarding table according to the global VPN id 100, forwards the packet to the next hop according to the forwarding information of the entry, sends the packet to ASBR2 node, and sets a field of protocol type in the corresponding layer 2 encapsulation as "Multicast global VPN".

At step 508, after receiving the packet, ASBR2 knows, according to the protocol type "Multicast global VPN" in the layer 2 header, that the global VPN id information is just after the layer 2 encapsulation in the packet. After ASBR2 node removes the layer 2 encapsulation of the packet, the entry using the global VPN id 100 as the key value is searched in the global VPN id forwarding table according to the global VPN id 100, and according to the forwarding information of the entry, the packed is encapsulated with a BIER header and forwarded to PE2 node. The field of the packet type encapsulated in the BIER header is set as "Multicast global VPN", and the BitString in the BIER header contains a corresponding bit of PE2.

At step 509, after the BIER header is locally removed at PE2, the packet is sent to the multicast service layer according to the BIER forwarding flow. PE2 knows that the global VPN id information is just after the BIER header in the packet according to the value "Multicast global VPN" of the field of packet type encapsulated in the BIER header. After removing the BIER header and the global VPN id 100 from the packet, PE2 node continues to forward the remaining load by searching the multicast VRF routing table corresponding to the global VPN id 100, and the packet is sent to D node.

Figure 8:
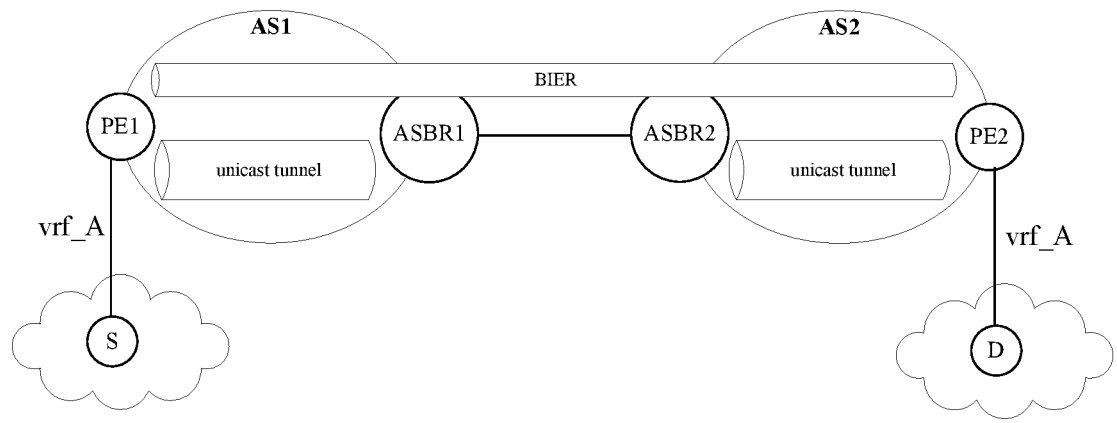
FIG. 8 is a network topology diagram of a multicast VPN cross-domain option C scenario according to an embodiment of the present disclosure.

FIG. 8 is a network topology diagram of a multicast VPN cross-domain option C scenario according to the embodiment, in which no instance of VRF is created at ASBR1 and ASBR2 nodes, and S-PMSI A-D or I-PMSI A-D route corresponding to VRF_A is directly interacted between PE1 and PE2. A-D route is directly interacted between PE1 and PE 2.

The method for bearing the multicast VRF in the embodiment includes following steps 601 to 605.

At step 601, both nodes PE1 and PE2 assign a global VPN identifier to VRF_A, which is marked as global VPN id 100, and a corresponding instance of multicast VRF is created.

At step 602, ASBR2 notifies BFR prefix and BFR-id of PE2 to ASBR1 via EBGP (external border gateway protocol) and ASBR1 continues to notify them to PE1 via IBGP (internal border gateway protocol).

At step 603, PE1 node notifies BGP I-PMSI A-D or S-PMSI A-D route to PE2 node, the tunnel type in the PTA is set as "BIER with global VPN" and the global VPN id 100 is contained. Other processes may be performed in accordance with the procedures defined in RFC6513, so that a set of corresponding multicast receivers may be determined to be {PE2} for a particular multicast stream of VRF_A on PE1 node, and the S node determines that PE1 is one of the receivers of the corresponding multicast stream.

At step 604, PE1 receives a particular multicast stream of S, searches for S-PMSI A-D or I-PMSI A-D route in multicast VRF routing table corresponding to the locally maintained instance of VRF_A, to match the packet to be transmitted, if the PTA of the matched route indicates "BIER with global VPN", the global VPN id of the route is pressed into the packet, and the packet is encapsulated with a BIER header and forwarded. The field of the packet type encapsulated in the BIER header will be set to "Multicast global VPN", and the BitString in the BIER header will contain a corresponding bit of PE2.

At step 605, after the BIER header is locally removed at PE2, the packet is sent to a multicast service layer according to a conventional BIER forwarding flow. PE2 knows that the global VPN id information is just after the BIER header in the packet according to the value "Multicast global VPN" of the field of packet type encapsulated in the BIER header. After removing the BIER header and the global VPN id 100 from the packet, PE2 node continues to forward the remaining load by searching the multicast VRF routing table corresponding to the global VPN id 100, and the packet is sent to D node.

The network of FIG. 8 corresponds in its entirety to the basic multicast VPN of FIG. 1, where PE1 corresponds to BFIR and PE2 corresponds to BFER.

An embodiment of the present disclosure further provides a computer-readable storage medium, on which a computer program is stored, where the computer program, when executed by a processor, causes the processor to implement the method according to any of above embodiments of the present disclosure.

It will be understood by those of ordinary skill in the art that all or some of steps of the method, functional modules/units of the device, system disclosed above may be implemented as software, firmware, hardware, or suitable combinations thereof. In a hardware implementation, a division between functional modules/units mentioned in the above description does not necessarily correspond to a division of physical components; for example, one physical component may have multiple functions, or one function or step may be performed by several physical components in cooperation. Some or all of the physical components may be implemented as software executed by a processor, such as a central processing unit, digital signal processor, or microprocessor, or as hardware, or as an integrated circuit, such as an application specific integrated circuit. Such software may be distributed on a computer-readable medium, which may include computer storage medium (or non-transitory medium). The term computer storage medium includes volatile and nonvolatile, removable and non-removable media implemented in any method or technology for storage of information such as computer readable instructions, data structures, program modules or other data, as is well known to those skilled in the art. Computer storage medium includes, but is not limited to, RAM, ROM, EEPROM, flash memory or other memory technology, CD-ROM, Digital Versatile Disks (DVD) or other optical disk storage, magnetic cassettes, magnetic tape, magnetic disk storage or other magnetic storage devices, or any other medium which can be used to store the desired information and which can be accessed by a computer.

INDUSTRIAL APPLICABILITY

As described above, the method and the device for bearing the multicast virtual private network provided in the embodiments of the present disclosure have a following beneficial effect: realizing packet forwarding through the global VPN identifier. The forwarding mechanism is simpler and easier to be implemented and deployed.

The invention claimed is:

1. A method for bearing a multicast virtual private network (VPN), comprising:
    assigning, by a bit-forwarding ingress router (BFIR) accessing a multicast virtual private network routing forwarding (VRF), a global VPN identifier for the multicast VRF, and carrying the global VPN identifier to notify a route to a bit-forwarding egress router (BFER) accessing the multicast VRF; and
    after receiving a packet of the multicast VRF, encapsulating, by the BFIR, the packet with a bit indexed explicit replication (BIER) header and forwarding the packet, wherein the forwarded packet carries the global VPN identifier,
    wherein the multicast VRF is uniquely identified by the global VPN identifier, and
    wherein the method further comprises:
    creating, by the BFIR, an instance of the multicast VRF, and in a route of a multicast VRF routing table corresponding to the instance, using an extended tunnel type to indicate that a tunnel is based on the BIER using the global VPN identifier; and
    after receiving the packet of the multicast VRF, searching, by the BFIR, for a route matched with the packet from the multicast VRF routing table, and pressing the global VPN identifier into the packet in response to that it is determined that the tunnel type of the route is the extended tunnel type; and then, encapsulating the packet with the BIER header and forwarding the packet.

2. The method of claim 1, wherein carrying the global VPN identifier to notify the route to the BFER accessing the multicast VRF comprises:

carrying the global VPN identifier in a multi-protocol label switching (MPLS) label field of the notified route to notify the route to the BFER accessing the multicast VRF.

3. The method of claim 1, wherein the BFIR notifies the route to the BFER accessing the multicast VRF by further setting the tunnel type in the route as the extended tunnel type.

4. The method of claim 1, further comprising:
after assigning the global VPN identifier, establishing, by the BFIR, a table entry with the global VPN identifier as a key value in a forwarding table, and recording forwarding information of the packet carrying the global VPN identifier in the table entry;
after receiving the packet of the multicast VRF, removing, by the BFIR, a layer 2 header of the packet, searching for the forwarding information from the forwarding table in response to that the BFIR determines that the layer 2 header comprises the global VPN identifier according to a protocol type extended in the layer 2 header; and then, encapsulating the packet with the BIER header and forwarding the packet.

5. The method of claim 4, wherein the BFIR explicitly configures an ability of establishing an entry using the global VPN identifier as a key.

6. The method of claim 1, wherein encapsulating, by the BFIR, the packet with the BIER header comprises:
setting a packet type in the BIER header as an extended packet type, wherein the extended packet type is used for indicating that the packet carries the global VPN identifier of the multicast VRF.

7. A bit-forwarding ingress router, comprising:
an identifier assigning module configured to assign a global virtual private network (VPN) identifier for a multicast virtual private network routing forwarding (VRF) accessed by the bit-forwarding ingress router (BFIR);
a route notifying module configured to notify a route to a bit-forwarding egress router (BFER) accessing the multicast VRF, where the route carries the global VPN identifier; and
a packet forwarding module configured to encapsulate a packet of the multicast VRF with a bit indexed explicit replication (BIER) header after receiving the packet, and forward the packet, wherein the forwarded packet carries the global VPN identifier,
wherein the multicast VRF is uniquely identified by the global VPN identifier, and
wherein the bit-forwarding ingress router further comprises:
an instance creating module configured to create an instance of the multicast VRF, wherein in a route of a multicast VRF routing table corresponding to the instance, an extended tunnel type is used for indicating that a tunnel is based on the BIER using the global VPN identifier;
the packet forwarding module is further configured, after receiving the packet of the multicast VRF, to search for a route matched with the packet from the multicast VRF routing table, and press the global VPN identifier into the packet in response to that a tunnel type of the route is determined to be the extended tunnel type; and then, encapsulate the packet with the BIER header and forwarding the packet.

8. The bit-forwarding ingress router of claim 7, wherein the route notifying module is further configured to set the tunnel type in the route as the extended tunnel type for notifying the route to the BFER accessing the multicast VRF.

9. The bit-forwarding ingress router of claim 7, further comprising:
a forwarding table maintenance module configured to establish a table entry with the global VPN identifier as a key value in a forwarding table, and record forwarding information of the packet carrying the global VPN identifier in the table entry;
the packet forwarding module is further configured, after receiving the packet of the multicast VRF, to remove a layer 2 header of the packet, search for the forwarding information from the forwarding table in response to that it is determined that the layer 2 header comprises the global VPN identifier according to a protocol type extended in the layer 2 header; and then, encapsulate the packet with the BIER header and forward the packet.

10. The bit-forwarding ingress router of claim 7, wherein the packet forwarding module is further configured to set a packet type in the BIER header as an extended packet type to encapsulate the packet with the BIER header, wherein the extended packet type is used for indicating that the packet carries the global VPN identifier of the multicast VRF.

11. A method for bearing a multicast virtual private network (VPN), comprising:
assigning, by a bit-forwarding egress router (BFER) accessing a multicast virtual private network routing forwarding (VRF), a global VPN identifier for the multicast VRF and recording forwarding information of a packet with the global VPN identifier; and
after receiving the packet with the global VPN identifier, removing, by the BFER, a bit indexed explicit replication (BIER) header of the packet, searching for the forwarding information and forwarding the packet,
wherein the multicast VRF is uniquely identified by the global VPN identifier, and
wherein recording, by the BFER, the forwarding information of the packet with the global VPN identifier comprises:
creating, by the BFER, an instance of the multicast VRF, and recording the forwarding information of the packet with the global VPN identifier in a route of a multicast VRF routing table corresponding to the instance; and
searching, by the BFER, for the forwarding information and forwarding the packet comprises:
removing the global VPN identifier after the BIER header in response to that the BFER determines that the packet type in the BIER header is an extended packet type, and forwarding the remaining load by searching the multicast VRF routing table, wherein the extended packet type is used for indicating that the packet carries the global VPN identifier of the multicast VRF.

12. The method of claim 11, wherein recording, by the BFER, the forwarding information of the packet with the global VPN identifier comprises:
establishing, by the BFER, a table entry with the global VPN identifier as a key value in a forwarding table, and recording forwarding information of a packet with the global VPN identifier in the table entry; and
searching, by the BFER, for the forwarding information and forwarding the packet comprises:
searching for the forwarding information in the forwarding table according to the global VPN identifier after the BIER header in response to that the BFER determines that the packet type in the BIER header is an extended packet type and forwarding the packet, wherein the extended packet type is used for indicating that the packet carries the global VPN identifier of multicast VRF.

13. The method of claim 12, wherein forwarding, by the BFER, the packet comprises:

encapsulating, by the BFER, the packet in layer 2, setting a protocol type in a layer 2 header as an extended protocol type, wherein the extended protocol type is used for indicating that there is the global VPN identifier after the layer 2 header.

14. A bit-forwarding ingress router, comprising a memory, a processor and a computer program stored on the memory and executable on the processor, the processor, when executing the computer program, implements the method of claim 1.

15. A bit-forwarding egress router, comprising a memory, a processor and a computer program stored on the memory and executable on the processor, the processor, when executing the computer program, implements the method of claim 11.

16. A non-transitory computer-readable storage medium, on which a computer program is stored, where the computer program, when executed by a processor, causes the processor to implement the method according to claim 1.

17. A non-transitory computer-readable storage medium, on which a computer program is stored, where the computer program, when executed by a processor, causes the processor to implement the method according to claim 11.

* * * * *